(12) United States Patent
Raz et al.

(10) Patent No.: US 12,197,919 B1
(45) Date of Patent: Jan. 14, 2025

(54) DYNAMIC SOFTWARE INTERFACE TRANSLATION FOR COMPUTING IN A HETEROGENEOUS ENVIRONMENT

(71) Applicant: Next Silicon Ltd, Givatayim (IL)

(72) Inventors: Elad Raz, Ramat Gan (IL); Ilan Tayari, Tzur Hadassa (IL); Itay Bookstein, Tel Aviv (IL); Jonathan Lavi, RaAnana (IL)

(73) Assignee: Next Silicon Ltd, Givatayim (IL)

( * ) Notice: Subject to any disclaimer, the term of this patent is extended or adjusted under 35 U.S.C. 154(b) by 0 days.

(21) Appl. No.: 18/744,738

(22) Filed: Jun. 17, 2024

(51) Int. Cl.
*G06F 9/38* (2018.01)
*G06F 9/30* (2018.01)

(52) U.S. Cl.
CPC ........ *G06F 9/3836* (2013.01); *G06F 9/30065* (2013.01)

(58) Field of Classification Search
CPC .................................................. G06F 9/3836
See application file for complete search history.

(56) References Cited

U.S. PATENT DOCUMENTS

| | | | |
|---|---|---|---|
| 5,734,908 | A | 3/1998 | Chan |
| 5,809,450 | A | 9/1998 | Chrysos et al. |
| 6,609,248 | B1 | 8/2003 | Srivastava et al. |
| 6,802,056 | B1 | 10/2004 | Chaiken et al. |
| 8,789,063 | B2 | 7/2014 | Hodson et al. |
| 10,628,158 | B2 | 4/2020 | Gonzalez |
| 11,113,059 | B1 * | 9/2021 | Raz .................... G06F 9/3005 |
| 2004/0098373 | A1 | 5/2004 | Bayliss |
| 2004/0255279 | A1 | 12/2004 | Rawsthorne et al. |
| 2005/0055594 | A1 | 1/2005 | Doering et al. |
| 2005/0149915 | A1 | 7/2005 | Wu et al. |
| 2008/0163183 | A1 | 7/2008 | Li et al. |
| 2010/0094933 | A1 | 4/2010 | Hickson et al. |
| 2010/0153934 | A1 | 6/2010 | Lachner |

(Continued)

FOREIGN PATENT DOCUMENTS

WO WO 2022/172263 8/2022

OTHER PUBLICATIONS

International Search Report and the Written Opinion Dated May 2, 2022 From the International Searching Authority Re. Application No. PCT/IL2022/050020. (16 Pages).

(Continued)

*Primary Examiner* — Michael J Metzger

(57) ABSTRACT

A system for executing a software program comprising processing units and a hardware processor configured to: for at least one set of blocks, each set comprising a calling block and a target block of an intermediate representation of the software program, generate control-transfer information describing at least one value of the software program at an exit of the calling block (out-value) and at least one other value of the software program at an entry to the target block (in-value); select a set of blocks according to at least one statistical value collected while executing the software program; generate a target set of instructions using the target block and the control-transfer information; generate a calling set of instructions using the calling block and the control-transfer information; configure a calling processing unit to execute the calling set of instructions; and configure a target processing unit to execute the target set of instructions.

30 Claims, 5 Drawing Sheets

(56) References Cited

U.S. PATENT DOCUMENTS

| | | | |
|---|---|---|---|
| 2013/0179733 A1 | 7/2013 | Frank et al. | |
| 2013/0205286 A1* | 8/2013 | Barraclough | G06F 9/45516 717/151 |
| 2015/0046679 A1 | 2/2015 | Gathala et al. | |
| 2019/0042217 A1 | 2/2019 | Glossop et al. | |
| 2020/0409696 A1 | 12/2020 | Ould-Ahmed-Vall | |
| 2020/0409697 A1 | 12/2020 | Ould-Ahmed-Vall | |
| 2021/0029219 A1 | 6/2021 | Kamran et al. | |
| 2022/0100680 A1* | 3/2022 | Chrysos | G06F 13/4027 |
| 2022/0253312 A1 | 8/2022 | Raz et al. | |
| 2023/0229444 A1 | 7/2023 | Raz et al. | |

OTHER PUBLICATIONS

International Search Report and the Written Opinion Dated May 6, 2022 From the International Searching Authority Re. Application No. PCT/IL2022/050137. (17 Pages).

Notice of Allowance Dated May 12, 2021 From the US Patent and Trademark Office Re. U.S. Appl. No. 17/172,134. (14 Pages).

Notice of Allowance Dated Dec. 15, 2022 together with Interview Summary from the US Patent and Trademark Office Re. U.S. Appl. No. 17/406,151. (15 pages).

Notice of Allowance Dated Jun. 16, 2021 from the US Patent and Trademark Office Re. U.S. Appl. No. 17/141,267. (4 pages).

Official Action Dated Feb. 18, 2021 From the US Patent and Trademark Office Re. U.S. Appl. No. 17/141,267. (11 Pages).

Official Action Dated Apr. 28, 2021 From the US Patent and Trademark Office Re. U.S. Appl. No. 17/141,267. (12 Pages).

Munroe et al "Low Level Performance Analysis. Identifying Opportunities for Improving Compiler Code Generation", Proceedings of the GCC Developers' Summit, XP055254370, Ottawa, Ontario, Canada, Jun. 28-30, 2006, p. 219-234, XP055254370, Jun. 28, 2006.

Schmid "Asynchronous Completion Token", Retrieved from the Internet, 1-16 P., XP055321943, Nov. 26, 1999.

Notice of Allowance Dated Sep. 6, 2024 together with Interview Summary Dated Aug. 27, 2024 from the US Patent and Trademark Office Re. U.S. Appl. No. 18/127,719. (11 pages).

\* cited by examiner

DYNAMIC SOFTWARE INTERFACE TRANSLATION FOR COMPUTING IN A HETEROGENEOUS ENVIRONMENT

FIELD AND BACKGROUND OF THE INVENTION

Some embodiments described in the present disclosure relate to a computing environment and, more specifically, but not exclusively, to a heterogeneous computing environment.

As used herein, the term "processing unit" is used to mean any kind of programmable or non-programmable circuitry that is configured to carry out a set of operations. A processing unit may comprise hardware as well as software. For example, a processing unit may comprise one or more processors and a transitory or non-transitory memory that carries a program which causes the processing unit to perform the respective operations when the program is executed by the one or more processors.

In computing, the term "computer architecture" refers to the organization of components making up a computer system and the semantics or meaning of operations that guide the computer system's function. For brevity, henceforth the term "architecture" is used to mean "computer architecture" and the terms are used interchangeably. As used herewithin, the term "platform" refers to a combination of a hardware computer architecture and an operating system.

As used herewithin, the term "homogenous system" refers to a computing system having a plurality of processing units all having a common platform (architecture and operating system). For example, a computing system having a plurality of central processing units (CPUs) having a common architecture and all executing a common operating system is a homogenous system.

As used herewithin, the term "heterogeneous system" refers to a computerized system having a plurality of processing units where at least one processing unit of the plurality of processing units has an architecture different from another architecture of another of the plurality of processing units, and additionally or alternatively executes an operating system different from another operating system of the other processing unit. For example, a system having a CPU and a GPU is a heterogeneous system. Another example of a heterogeneous system is a system having a CPU and a field-programmable gate array (FPGA) co-processor. Another example of a heterogeneous system is a system having a CPU having a complex instruction set computer (CISC) based architecture and another CPU having a reduced instruction set computer (RISC) based architecture. An additional example of a heterogenous system is a system having two or more CPUs where each supports a different instruction set architecture (ISA), for example one CPU supporting an Intel x86 ISA and another CPU supporting Motorola 68000 series ISA, or one CPU supporting an ARM ISA and another CPU supporting a RISC-V ISA. In yet another example of a heterogeneous system, the heterogeneous system has one or more high-performance CPUs having a high power consumption and one or more efficient CPUs having a low power consumption. In still another example of a heterogeneous system, the heterogeneous system has one or more processing units executing a first operating system, for example a Unix based operating system, and one or more other processing units executing a Microsoft Windows based operating system.

In the field of computing, the term performance refers to an amount of useful work performed by a computerized system. Some characteristics of useful work include the rate at which work is performed, utilization of computation resources, for example an amount of memory used or an amount of network bandwidth consumed, and an amount of time it takes the computerized system to react to input. There are a variety of metrics for measuring the amount of useful work. Some metrics are specific to a context of the computerized system; some other metrics are generic metrics that may be measured in a variety of computerized systems. As used herewithin, the term "improving performance" refers to improving one or more performance scores measured, or computed, according to one or more performance metrics. Two common metrics used to measure a processing unit's performance are latency and throughput. Latency is an amount of time it takes a processing unit to perform an identified operation. Some examples of an identified operation are delivering a data packet from a source to a destination, and executing an identified set of computer instructions in response to an input value. Improving latency refers to reducing the amount of time it takes the processing unit to perform the identified operation. Throughput is an amount of identified operations the processing unit performs in a time interval, for example an amount of data packets delivered during the time interval. Another example of a system's throughput is an amount of input values for which the processing unit executes the identified set of computer instructions in the time interval. Improving throughput refers to increasing the amount of identified operations the processing unit performs in the time interval.

In computer programming, an intermediate representation of a computer program is a representation of the computer program in an abstract machine language which expresses operations of a machine (processing unit) while not being specific to any particular machine.

SUMMARY OF THE INVENTION

Some embodiments of the present disclosure describe executing a software program in a heterogeneous computing system comprising a plurality of processing units, each having one of a plurality of computer architectures.

It is an object of some embodiments described in the present disclosure to provide a system and a method for selecting a set of blocks of a plurality of blocks of the software program, the set of blocks comprising a calling block and a target block where the calling block invokes the target block, and generating a calling set of executable instructions and a target set of executable instructions for execution on a calling processing unit and a target processing unit of a plurality of processing units of the system, respectively, by generating for one or more sets of blocks control-transfer information describing one or more values of the software program at an exit of the calling block (out-value) and one or more other values of the software program at an entry to the target block (in-value), and selecting the set of blocks from the one or more sets of blocks according to one or more statistical values collected while executing the software program. Generating control-transfer information for one or more sets of blocks allows deciding at a time other than initial compilation of the software program, for example after collecting the one or more statistical values, which set of blocks of the one or more sets of blocks to execute on the calling processing unit and target processing unit. Selecting the set of blocks according to the one or more statistical values collected while executing the software program facilitates increasing performance of the system executing the software program, for example reducing latency and additionally or alternatively increasing throughput, compared to selecting the set of blocks arbitrarily. Furthermore, generating control-transfer information for one or more sets of blocks allows selecting the calling processing unit and additionally or alternatively the target processing unit at a time other than initial compilation of the software program, for example after collecting the one or more statistical values and optionally according to the one or more statistical values and additionally or alternatively according to the selected set of blocks, which facilitates increasing performance of the system executing the software program compared to executing the software program using a predetermined distribution of execution among the plurality of processing units. Including one or more out-values of the calling block and one or more in-values of the target block allows transferring one or more data values from the calling block to the target block, allowing a control-transfer point between the calling block and the target block to be any control transfer between blocks and not only function calls with a standard interface, allowing increasing performance of the system compared to allowing control-transfer only using calls with a standard ABI.

The foregoing and other objects are achieved by the features of the independent claims. Further implementation forms are apparent from the dependent claims, the description and the figures.

According to a first aspect, a system for executing a software program comprises a plurality of processing units and at least one hardware processor configured to: for at least one set of blocks, each set comprising a calling block and a target block of a plurality of blocks of an intermediate representation of the software program, generate control-transfer information describing at least one value of the software program at an exit of the calling block (out-value) and at least one other value of the software program at an entry to the target block (in-value); select a set of blocks of the at least one set of blocks according to at least one statistical value, where the at least one statistical value is collected while executing the software program; generate a target set of executable instructions using the target block and the control-transfer information of the selected set of blocks; generate a calling set of executable instructions using the calling block and the control-transfer information of the selected set of blocks; configure a calling processing unit of the plurality of processing units to execute the calling set of executable instructions; and configure a target processing unit of the plurality of processing units to execute the target set of executable instructions.

According to a second aspect, a method for executing a software program comprises: for at least one set of blocks, each set comprising a calling block and a target block of a plurality of blocks of an intermediate representation of the software program, generating control-transfer information describing at least one value of the software program at an exit of the calling block (out-value) and at least one other value of the software program at an entry to the target block (in-value); selecting a set of blocks of the at least one set of blocks according to at least one statistical value, where the at least one statistical value is collected while executing the software program; generating a target set of executable instructions using the target block and the control-transfer information of the selected set of blocks; generating a calling set of executable instructions using the calling block and the control-transfer information of the selected set of blocks; configuring a calling processing unit of a plurality of processing units to execute the calling set of executable instructions; and configuring a target processing unit of the plurality of processing units to execute the target set of executable instructions.

According to a third aspect, a software program product for executing a software program comprises: a non-transitory computer readable storage medium; first program instructions for: for at least one set of blocks, each set comprising a calling block and a target block of a plurality of blocks of an intermediate representation of the software program, generating control-transfer information describing at least one value of the software program at an exit of the calling block (out-value) and at least one other value of the software program at an entry to the target block (in-value); second program instructions for: selecting a set of blocks of the at least one set of blocks according to at least one statistical value, where the at least one statistical value is collected while executing the software program; third program instructions for: generating a target set of executable instructions using the target block and the control-transfer information of the selected set of blocks; fourth program instructions for: generating a calling set of executable instructions using the calling block and the control-transfer information of the selected set of blocks; fifth program instructions for: configuring a calling processing unit of a plurality of processing units to execute the calling set of executable instructions; and sixth program instructions for: configuring a target processing unit of the plurality of processing units to execute the target set of executable instructions; wherein the first, second, third, fourth, fifth and sixth program instructions are executed by at least one computerized processor from the non-transitory computer readable storage medium.

With reference to the first and second aspects, in a first possible implementation of the first and second aspects the at least one hardware processor is further configured to select the set of blocks, generate the target set of executable instructions, generate the calling set of executable instructions, configure the calling processing unit and configure the target processing unit while executing the software program. Performing these steps while executing the software program provides the technical benefit of reducing an amount of disruptions to one or more services 20 provided by the software program while increasing performance of the system executing the software program by reconfiguring the calling processing unit and the target processing unit. Optionally, the at least one hardware processor is further configured to execute the software program in each of at least two iterations, comprising a first iteration and a second iteration, and the at least one hardware processor is additionally further configured to select the set of blocks, generate the target set of executable instructions, generate the calling set of executable instructions, configure the calling processing unit and configure the target processing unit after executing the software program in the first iteration and before executing the software program in the second iteration. Performing these steps between iterations of executing the software program provides the technical benefit of increasing reliability of the system executing the software program by avoiding execution of the software program on an inconsistent configuration of the system that may exist during the time of reconfiguring the calling processing unit and additionally or alternatively the target processing unit.

With reference to the first and second aspects, in a second possible implementation of the first and second aspects the calling processing unit has a first computer architecture, the target processing unit has a second computer architecture, the first computer architecture is different from the second computer architecture. Optionally, the first computer architecture is one of: a central processing unit, a multi-core central processing unit (CPU), a data processing unit (DPU), a microcontroller unit (MCU), an accelerated processing unit (APU), a field-programmable gate array (FPGA), a coarse-grained reconfigurable architecture (CGRA), a neural-network accelerator, an intelligence processing unit (IPU), an application-specific integrated circuit (ASIC), a quantum computer, and an interconnected computing grid, comprising a plurality of reconfigurable logical elements connected by a plurality of configurable data routing junctions. Optionally, the second computer architecture is one of: a central processing unit, a multi-core central processing unit (CPU), a data processing unit (DPU), a microcontroller unit (MCU), an accelerated processing unit (APU), a field-programmable gate array (FPGA), a coarse-grained reconfigurable architecture (CGRA), a neural-network accelerator, an intelligence processing unit (IPU), an application-specific integrated circuit (ASIC), a quantum computer, and an interconnected computing grid, comprising a plurality of reconfigurable logical elements connected by a plurality of configurable data routing junctions. Optionally, the calling processing unit executes a first operating system, the second processing unit executes a second operating system, and the first operating system is different from the second operating system. Optionally, at least one of the calling processing unit and the target processing unit does not execute an operating system. Selecting a calling processing unit and target processing unit that do not share a common architecture and additionally or alternatively do not share a common operating system allows increasing performance of the system executing the software program more than can be achieved in solutions where the calling processing unit and the target processing unit are limited to sharing an architecture, an operating system, or both. For example, in a system where no other processing unit having the first architecture and additionally or alternatively executing the first operating system is available and there exists another task that is better performed by the calling processing unit, freeing the calling processing unit to perform the other task while the target processing unit continues executing the target executable instructions reduces latency of the other task without impacting throughput of executing the target executable instructions.

With reference to the first and second aspects, in a third possible implementation of the first and second aspects executing the calling set of executable instructions by the calling processing unit comprises setting the out-value described by the control-transfer information to an identified value, and the target processing unit retrieves the identified value when accessing the in-value while executing the target set of executable instructions, where the in-value is described by the control-transfer information. Describing the out-value and the in-value by the control-transfer information allows transferring the identified value from the calling processing unit to the target processing unit even on execution boundaries that are not function calls.

With reference to the first and second aspects, in a fourth possible implementation of the first and second aspects the control-transfer information is not dependent on one identified computer architecture of the calling processing unit. Optionally, the control-transfer information is not dependent on one other identified computer architecture of the target processing unit. Optionally, the control-transfer information is not dependent on one identified operating system executed by the calling processing unit. Optionally, the control-transfer information is not dependent on one other identified operating system executed by the target processing unit. Generating control-transfer information that is not dependent on at least one of the calling processing unit's architecture, the target processing unit's architecture, the calling processing unit's operating system, and the target processing unit's operating system increases the likelihood of increasing performance of executing the software program by allowing more flexibility in choice of the calling processing unit and the target processing unit, as well as increases usability of the software program on a variety of systems.

With reference to the first and second aspects, in a fifth possible implementation of the first and second aspects the control-transfer information comprises a mapping between the out-value and the in-value. Optionally, the control-transfer information comprises at least one register of a processing circuitry. Optionally, the control-transfer information comprises at least one memory offset value. Optionally, the control-transfer information comprises at least one type value associated with the out-value, and at least one other type value associated with the in-value. Optionally, the at least one type value comprises at least one of: a type identifier, an amount of bits, and an endian indicator. Optionally, the control-transfer information comprises an amount of variables. Using control-transfer information comprising one or more of the above increases flexibility in the choice of the calling block and the target block, increasing likelihood of increasing performance of the software program and increasing usability of the software program on a variety of systems. Optionally, the control-transfer information comprises at least one computer instruction. Optionally, the at least one computer instruction comprises at least one compiled instruction. Optionally, the at least one computer instruction comprises at least one intermediate computer instruction. Including a computer instruction in the control-transfer information allows increasing accuracy of the calling set of executable instructions and additionally or alternatively of the target set of executable instructions. Including an intermediate computer instruction allows enjoying the benefit of accuracy independent of an architecture and/or an operating system of the calling processing unit and/or the target processing unit.

With reference to the first and second aspects, in a sixth possible implementation of the first and second aspects generating the control-transfer information is done before executing the software program, and the at least one hardware processor is further configured to select the target processing unit from the plurality of processing units after collecting the at least one statistical value. Optionally, the at least one hardware processor is further configured to generate the target set of computer instructions according to the selected target processing unit. Generating the control-transfer information before executing the software program and selecting the target processing unit after collecting the at least one statistical value reduces cost of development of the software program allowing generation of the control-transfer information once for a variety of systems and multiple executions of the software program, while allowing increasing performance of a system executing the software program according to runtime statistics.

With reference to the first and second aspects, in a seventh possible implementation of the first and second aspects the at least one hardware processor is further configured to add the control-transfer information to the intermediate representation of the software program. Adding the control-transfer information to the intermediate representation of the software program provides the technical benefit of making the control-transfer information available for any subsequent compilations of the software program, reducing cost of development.

With reference to the first and second aspects, in an eighth possible implementation of the first and second aspects the at least one hardware processor is further configured to: generate at least one executable software object for executing the software program; and at least one of: add the control-transfer information to the at least one executable software object; and add the control-transfer information to at least one file associated with the at least one executable software object. Adding the control-transfer information of an executable software object, and additionally or alternatively to a file associated with an executable software object, increases accuracy of associating the control-transfer information with the executable instructions of the executable software object, thus increasing accuracy of the calling set of executable instructions, the target set of executable instructions, or both.

With reference to the first and second aspects, in a ninth possible implementation of the first and second aspects the at least one hardware processor is further configured to: for the selected set of blocks, generate the control-transfer information of the selected set of blocks to further describe at least one additional value of the software program at another exit of the target block and at least one additional other value of the software program at another entry to another block of the selected set of blocks (other target block); generate another target set of executable instructions using the other target block and the control-transfer information of the selected set of blocks; and configure the calling processing unit of the plurality of processing units to execute the other target set of executable instructions. Configuring the calling processing unit to execute the other target set of executable instructions allows executing coroutines on multiple processing units, and more specifically on processing units having architectures different from each other and/or executing operating systems different from each other.

With reference to the first and second aspects, in a tenth possible implementation of the first and second aspects the system further comprises a plurality of memory areas, each connected to at least one of the plurality of processing units. Optionally, the at least one hardware processor is further configured to copy at least one memory value from a first memory area of the plurality of memory areas to a second memory area of the plurality of memory areas, where the first memory area is connected to the calling processing unit and the second memory area is connected to the target processing unit.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which embodiments pertain. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments are herein described, by way of example only, with reference to the accompanying drawings. With specific reference now to the drawings in detail, it is stressed that the particulars shown are by way of example and for purposes of illustrative discussion of embodiments. In this regard, the description taken with the drawings makes apparent to those skilled in the art how embodiments may be practiced.

DESCRIPTION OF SPECIFIC EMBODIMENTS OF THE INVENTION

Figure 1:
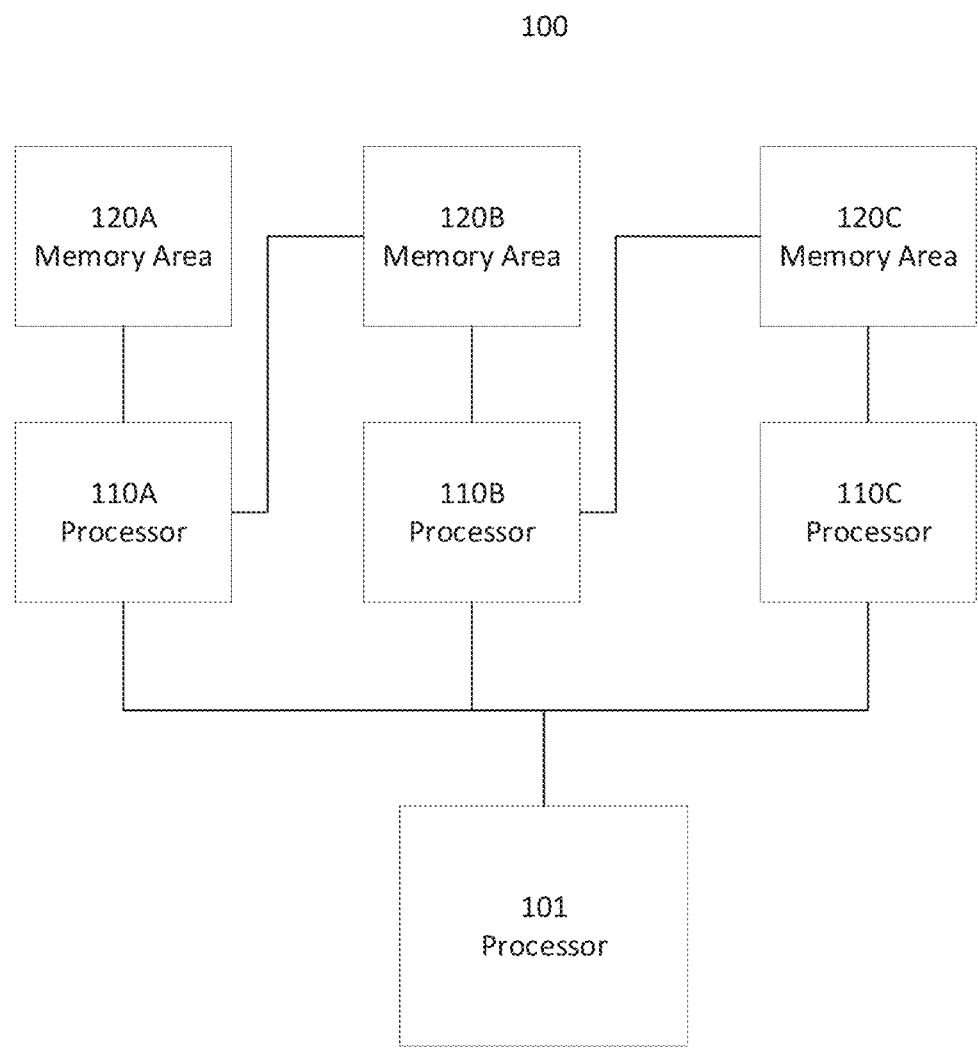
FIG. 1 is a schematic block diagram of an exemplary system, according to some embodiments.

In the field of computing, the term co-processor is used to describe a supplementary processing unit used to complement a primary processing unit of a system and facilitate improving performance of the system by offloading some processor-intensive tasks from the primary processing unit. As the demand for high performance computing increases, there is an increase in using co-processing to increase performance. Some co-processors are designed to perform a unique task. A commonly known co-processor is a floating-point processor, for performing floating point arithmetic tasks. Other examples of unique tasks which may be performed by a co-processor include network input-output interface tasks, encryption, string processing, graphics processing, linear algebra processing, machine learning processing, and signal processing. Other co-processors may be configured to execute arbitrary parts of a computer program, not characterized as a unique task.

Co-processing is different from distributed processing. In a distributed system, a problem is divided into a plurality of independent tasks, each solved by one or more of a plurality of processing units operating substantially independent of each other, possibly communicating therebetween. In co-processing, a co-processor supplements functionality of a primary processing unit and operates in conjunction with the primary processing unit.

There is a need to delegate parts of a computer program to be executed by one or more co-processors.

Some co-processors operate independently, without being invoked by a primary processing unit of a system. For example, a network interface co-processor may process received network packets with little, if any, involvement from the primary processing unit. Other co-processors receive instructions from the primary processing unit, for example a graphic processing unit (GPU) receiving instructions to render a digital image.

When two processing units of a system operate in conjunction, there may be a need to invoke operation of a target processing unit from a calling processing unit, for example invoking a co-processor from a primary processing unit. In addition to a calling processing unit invoking a target processing unit, there exist cases where there is a need to pass one or more data values from the calling processing unit to the target processing unit, for example input arguments of an operation performed by the target processing unit. In addition, there may be a need to pass one or more other data values from the target processing unit back to the calling processing unit, for example an outcome value computed by the target processing unit.

In computing, the term Application Binary Interface (ABI) refers to an interface between two binary program modules describing in hardware-dependent format how data and computational routines are accessed. An interface between the two binary program modules may comprise a format of one or more data structures. Additionally, or alternatively, the interface comprises a register assignment for control-flow transfer. Additionally, or alternatively, the interface comprises calling conventions for providing data as input to, and additionally or alternatively read as output from, computational routines, for example one or more data type signatures. An ABI is platform dependent, i.e. the ABI depends on the hardware of the executing processor and the operating system executed by the processor.

When executing a software program comprising a plurality of execution blocks, where the plurality of execution blocks comprises a calling execution block and a target execution block, we say that the calling execution block invokes the target execution block when the calling execution block includes one or more control-flow instructions to execute one or more instructions of the target calling block. When executing the software program by a plurality of processing units, it may be that a calling processing unit executing the calling execution block invokes the target execution block executed by a target processing unit. In such a case, invoking the target execution block by the calling execution block requires producing a set of instructions executed by the calling processing unit according to an interface of the target processing unit.

In computer programming, a software function, also known simply as a "function," is a self-contained block of code that performs a specific task or set of tasks. A function has a name that uniquely identifies it within a software program, and which is used to invoke or call the function from other parts of the code of the software program. A function may take parameters as input and additionally or alternatively return a value as an outcome of its execution.

When the calling processing unit and target processing unit have a common platform, invoking the target execution block by the calling execution block does not require adjustments between an ABI of the calling processing unit and another ABI of the target processing unit as they share a common ABI. The set of instructions executed by the calling processing unit according to the interface of the target processing unit implements the common ABI.

When invoking the target execution block is by a call to a software function, an interface for invoking the software function may be standard across a plurality of platforms, according to a programming language in which the code of the software program is written, for example the C Language ABI. This standard defines adjustments that need to be made so that the target execution block accesses data and computational routines correctly.

However, when invoking the target execution block is by executing a computer instruction of the target execution block, no standard for transferring control-flow exists. Information describing control-flow transfer (control-transfer information) from a calling execution block to a target execution block comprises an abstract mapping of a flow of data between the calling execution block and target execution block. In the field of computer compilers, this mapping is called "live in +live out" and may include a mapping of one or more registers. The mapping may include a mapping between one or more exit values of the calling execution block and one or more input values of the target execution block. The mapping may include one or more memory offset values. The mapping may include one or more type values associated with one or more data values, for example a type identifier, an amount of bits or an endian indicator. One or both of the calling execution block and the target execution block may be blocks that are not basic block, i.e. each may have more than one exit point to invoke another block.

This mapping is shared within a platform, but is not shared between platforms. Thus, a context switch from a calling processing unit to a target processing unit that share a common platform may be executed without a need to make adjustments to ensure data and computational routines are accessed correctly, however a context switch from a calling processing unit to a target processing unit of different platforms requires adjustments to ensure the target execution block accesses data and computational routines correctly, that is there is a need to make adjustments between an ABI of a platform of the calling processing unit and another ABI of another platform of the target processing unit.

In a homogenous system, where a plurality of processing units has a common architecture and thus a common ABI, an execution block may be compiled to invoke another execution block executed by another processing unit without determining in advance which of the plurality of processing units will execute the other execution block. However, performance improvements achieved in a homogenous system are limited by the common architecture's support for the dynamically allocated tasks. For example, when each of the plurality of processing units is a CPU, delegating one or more floating point arithmetic operations to another CPU may provide less performance improvement than delegating the one or more floating point arithmetic operations to a floating-point processor.

A heterogeneous system optionally comprises a first target processing unit having a first platform and a second target processing unit having a second architecture. In such a heterogeneous system, a set of instructions executed by a calling processing unit and invoking an execution block executed by the first target processing unit is produced according to a first ABI of the first architecture. In such a heterogeneous system, the set of instructions might not be used to invoke the same execution block when executed by the second target processing unit, as a second ABI for the second architecture may be different from the first ABI.

When it is possible to identify in advance one or more execution blocks to be executed by a co-processor, and when the co-processor is known when compiling the software program from source files or from an intermediate representation, one or more appropriate sets of instructions may be produced to instruct the co-processor to execute the one or more execution blocks. However, performance improvements achieved by producing instructions for the co-processor in advance are limited by an ability to identify such tasks that improve a system's performance when delegated to one or more co-processors. In addition, such a solution is limited to platforms and transfer points that are known in advance at compile time. Such a solution does not allow dynamic decisions, during runtime, to transfer control, because the information required to do this translation is not available.

In addition, there may be a need to provide the target processing unit with an execution state of the calling processing unit, for example to share access privileges, for example to a file or a memory area, and additionally or alternatively to share one or more data values. Other examples of a shared execution state include a network socket context, a view of network topology, and a virtualization context, for example Single Root Input/Output Virtualization (SRIOV). An execution state may include, but is not limited to, one or more of a thread identification value, a process identification value, an instruction address of an instruction to execute after executing a return instruction (a return address), and one or more formal argument values of a function. Optionally, the calling execution block and the target execution block access a common range of application memory addresses of the software program. Some examples of an application memory address include, but are not limited to, a physical memory address, a virtual memory address, a memory-mapped input-output address, and a bus address. Optionally, the target execution block comprises accessing one or more devices of the computerized system, for example a disk drive or a network adapter. Optionally, there is a need to provide the target processing unit, via the ABI, with one or more device handles associated with the one or more devices.

Just-In-Time (JIT) compilation is a compilation and execution strategy used by some programming languages and runtime environments. With JIT compilation, source code of a software program, or an intermediate representation of the source code, is translated into machine code just before it is executed. As the software program runs, the JIT compiler identifies parts of the code that require compilation, i.e. translation into machine code. JIT compilation allows for platform independence, as the same source code or intermediate representation can be compiled to machine code on multiple architectures according to a processor executing the software program, without knowing in advance what architecture is needed. A main characteristic of JIT compilation is that code is compiled for one or more control-transfer points (for example, control-transfer to another module of the software program or to a library either external to the software program or linked to the executable code of the software program) when execution reaches such a control-transfer point. Which control-transfer points require compilation are not selected a priori, before execution of the software program. JIT compilation is not typically used to transfer control between processing units, let alone between processing units of different platforms. However, within the JIT compilation paradigm, any control-transfer information at a control-transfer point in the software program's code would be generated when execution reaches the control-transfer point and not a priori, before execution of the software program.

When executing a software program in a system comprising a plurality of processing units, it is desirable to allow deciding during runtime how to distribute execution of a plurality of execution blocks of the software program among the plurality of processing units. Deciding during runtime how to distribute execution of the plurality of execution blocks among the plurality of processing units facilitates incrementing utilization of the plurality of processing units, i.e. increasing a percentage of an amount of time of a time interval that the processing units are used to execute code in said time interval. Additionally or alternatively, deciding during runtime allows executing a block of code on another of the plurality of processing units when an original processing unit on which the block of code was supposed to execute is busy, reducing latency in executing the block of code and additionally or alternatively increasing an amount of tasks executed in an identified amount of time (throughput), thus increasing performance of the system.

When the system is a heterogeneous system, there is a need to generate executable code for each block of the plurality of blocks of the software program according to a respective platform of the processing unit that executes the block. When distribution of the plurality of blocks among the plurality of processing units is known in advance it is possible to generate such tailored executable code. However, this is limited to known platforms and a known distribution of the plurality of blocks among the plurality of processing units, and thus limits usability of the software program.

To allow runtime decisions of distributing execution of the plurality of execution blocks of the software program among the plurality of processing units, and to allow runtime decisions of distributing execution of the plurality of execution blocks among a plurality of platforms, the present disclosure, in some embodiments described herewithin, proposes preparing in advance control-transfer information for one or more sets of blocks of an intermediate representation (IR) of the software program. In such embodiments, each set of the one or more sets comprises a calling block and a target block, each of the plurality of blocks of the IR, and the control-transfer information describes one or more values of the software program at an exit of the calling block (out-value) and one or more values of the software program at an entry to the target block (in-value). Optionally, each set of blocks of the one or more sets of blocks includes a control-transfer point, where execution is transferred from the calling block of the set of blocks to the target block of the set of blocks. Further in such embodiments, a set of blocks of the one or more sets of blocks is selected according to one or more statistical values, where the one or more statistical values are collected while executing the software program. Optionally, the present disclosure proposes generating a target set of executable instructions using the target block and the control-transfer information of the selected set of blocks and a calling set of executable instructions using the calling block and the control-transfer information of the set of blocks. Optionally, the calling set of executable instructions comprises one or more control-transfer instructions for invoking execution of the target set of execution instructions. Optionally, the present disclosure proposes configuring a calling processing unit of the plurality of processing units to execute the calling set of executable instructions and configuring a target processing unit of the plurality of processing units to execute the target set of executable instructions. Optionally, one or more of the target processing unit and the calling processing unit are selected according to the one or more statistical values, for example according to a statistical value indicative of a processing load of a processing unit. Generating control-transfer information for one or more sets of blocks allows deciding at a time other than initial compilation of the software program, for example after collecting the one or more statistical values, which set of blocks of the one or more sets of blocks to execute on the calling processing unit and target processing unit. Selecting the set of blocks according to the one or more statistical values collected while executing the software program facilitates increasing performance of the system executing the software program, for example reducing latency and additionally or alternatively increasing throughput, compared to selecting the set of blocks arbitrarily. Furthermore, generating control-transfer information for one or more sets of blocks allows selecting the calling processing unit and additionally or alternatively the target processing unit at a time other than initial compilation of the software program, for example after collecting the one or more statistical values and optionally according to the one or more statistical values and additionally or alternatively according to the selected set of blocks, which facilitates increasing performance of the system executing the software program compared to executing the software program using a predetermined distribution of execution among the plurality of processing units. Including one or more out-values of the calling block and one or more in-values of the target block allows transferring one or more data values from the calling block to the target block, allowing a control-transfer point between the calling block and the target block to be any control transfer between blocks and not only function calls with a standard interface, allowing increasing performance of the system compared to allowing control-transfer only using calls with a standard ABI.

Optionally, selecting the set of blocks, generating the target set of executable instructions, generating the calling set of executable instructions, configuring the target processing unit and configuring the calling processing unit are executed while executing the software program. Performing the above mentioned steps while executing the software program allows increasing system performance without interrupting execution of the software program, such that system performance is increased without reducing availability of one or more services provided by the software program.

Optionally, the software program is executed in two or more iterations, comprising a first iteration and a second iteration. Optionally, selecting the set of blocks, generating the target set of executable instructions, generating the calling set of executable instructions, configuring the target processing unit and configuring the calling processing unit are executed between two iterations of executing the software program, i.e. after executing the software program in the first iteration and before executing the software program in the second iteration. Optionally, the one or more statistical values used for selecting the set of blocks are collected while executing the software program in one or more iterations of the two or more iterations preceding the second iteration, optionally including the first iteration. Performing the above mentioned steps between two iterations of executing the software program allows combining these steps with other steps that cannot be performed while the software program is executed, reducing cost of system operation compared to performing some steps between execution iterations and some steps while the software program executes.

Optionally, the calling processing unit and the target processing unit have a common platform. Optionally, a platform of the calling processing unit is different from another platform of the target processing unit. Thus, the calling processing unit may have an architecture that is different from another architecture of the target processing unit. Additionally or alternatively, the calling processing unit may execute an operating system that is different from another operating system executed by the target processing unit. Optionally either the calling processing unit or the target processing unit, or both, do not execute an operating system.

Optionally, the control-transfer information is not dependent on a computer architecture of the calling processing unit, such that the control-transfer information may be used to generate the calling set of executable instructions for a first architecture of a first calling processing unit and to generate another calling set of executable instructions for a second architecture of a second processing unit, for example in another iteration of executing the software program, for example after collecting one or more other statistical values. Optionally, the control-transfer information is not dependent on another computer architecture of the target processing unit, such that the control-transfer information may be used to generate the target set of executable instructions for another first architecture of another first calling processing unit and to generate another target set of executable instructions for another second architecture of another second processing unit, for example in yet another iteration of executing the software program, for example after collecting one or more yet other statistical values.

Optionally, the control-transfer information is not dependent on an operating system executed by the calling processing unit, such that the control-transfer information may be used to generate the calling set of executable instructions for a first operating system executed by the first calling processing unit and to generate the other calling set of executable instructions for a second operating system executed by the second processing unit. Optionally, the control-transfer information is not dependent on another operating system executed by the target processing unit, such that the control-transfer information may be used to generate the target set of executable instructions for another first operating system executed by the first calling processing unit and to generate the other target set of executable instructions for another second operating system executed by the other second processing unit.

Optionally, the control-transfer information comprises one or more computer instructions. The one or more computer instructions may implement a flow of data between the calling block and the target block. Optionally, the one or more computer instructions comprise at least one compiled instruction. The compiled instruction may be for execution by the calling processing unit. The compiled instruction may be for execution by the target processing unit. A compiled instruction may be a machine code instruction. Optionally, the one or more computer instructions comprise at least one intermediate computer instruction in an intermediate programming language, which is independent of a platform of the calling processing unit and independent of another platform of the target processing unit. Including a computer instruction in the control-transfer information reduces complexity of generating the calling set of executable instructions and the target set of executable instructions.

Optionally, the control-transfer information is added to an intermediate representation of the software program. Optionally, the control-transfer information is added to one or more executable software objects of the software program. Optionally, the control-transfer information is added to one or more other files associated with the one or more executable software objects. Adding the control-transfer information to an executable software object of the software program and additionally or alternatively to another file associated therewith allows generating the calling set of executable instructions and the target executable instructions without access to original source code of the software program, for example in a system executing the software program.

In addition, transferring control of execution between the calling processing unit and the target processing unit may require moving data from one memory area of the system to another memory area, for example when there is no shared memory area between the calling processing unit and the target processing unit. In some embodiments, one or more memory values are copied from a first memory area of a plurality of memory areas of the system to a second memory area of the plurality of memory areas of the system. Optionally, the first memory area is connected to the calling processing unit and the second memory area is connected to the target processing unit.

Optionally, the set of blocks is at least part of a software function. Optionally, the calling set of executable instructions and the target set of instructions are at least part of the software function. Executing the calling block on the calling processing unit having a first architecture and the target block on the target processing unit having a second architecture allows distributing execution of the software function over multiple architectures.

In the field of computer programming, the term "coroutine" refers to a mechanism for cooperative multitasking where multiple tasks or computations are executed using common processing resources and may voluntarily yield control to one another at identified points of execution, for example to ensure that other tasks get a chance to run. This is different from preemptive multitasking, where an operating system decides when to switch tasks. One example of an implementation of coroutines is the Low-Level Virtual Machine (LLVM) project coroutines. Other examples of implementations of coroutines for an intermediate representation of a program include constructs in Microsoft Intermediate Language (MSIL) and Kotlin conroutines using Java Virtual Machine bytecode. Other examples of coroutine implementations include programming language specific implementations, for example in C# or in Python. When the set of blocks is at least part of a software function that is implemented as a coroutine, a first block, a second block and a third block of the set of blocks may be executed concurrently, with control transferring from the first block to the second block and then from the second block to the third block. Thus, in some embodiments described herewithin, the first block is a first calling block, the second block is a first target block as well as a second calling block, and the third block is a second target block. In such embodiments, control is passed from the calling processing unit having the first architecture and executing the first block (as the first calling block) to the target processing unit having the second architecture and executing the second block (as the first target block), and back from the target processing unit executing the second block (as the second calling block) to the calling processing unit executing the third block (as the second target block). Optionally, the control-transfer information describes yielding of control in the coroutine, in this example between the first block, the second block and the third block.

As described above, the control-transfer information optionally includes one or more control-transfer instructions. Optionally, the one or more control-transfer instructions include one or more sets of switch instructions. Some other examples of a control-transfer instruction include a return instruction, a pause instruction, and a resume instruction. Optionally, the control-transfer information comprises one or more instructions transferring control from the calling block to the target block. Optionally, the control-transfer information additionally comprises one or more other instructions transferring control from the target block to another target block of the set of blocks, such that the target block becomes another calling block with respect to the other target block. Optionally, the other target block is the calling block. Optionally, the control-transfer instructions are for transferring control to a scheduler. Optionally, other control-transfer instructions are for transferring control from the target block to the scheduler. Optionally, a control-transfer instruction is platform dependent, i.e. dependent on an architecture of a processing unit and additionally or alternatively on an operating system of a processing unit. When the calling processing unit has the first architecture and the target processing unit has the second architecture, optionally one or more first control-transfer instructions in the calling set of executable instructions, for transferring control from the calling processing unit to the target processing unit, are dependent on the first architecture and further optionally one or more second control-transfer instructions in the target set of executable instructions, for receiving control from the calling processing unit, are dependent on the second architecture. When one or more control-transfer instructions include a set of instructions for implementing a switch operation, this allows reducing an amount of instructions in the target set of executable by including in the calling set of executable instructions, and not in the target set of executable instructions, a first set of executable instructions that are dependent on the first architecture and are to be executed on the calling processing unit and not the target processing unit. Additionally or alternatively, in a similar manner this allows reducing another amount of instructions in the calling set of executable instructions by including in the target set of executable instructions, and not in the calling set of executable instructions, a second set of executable instructions that are dependent on the second architecture and are to be executed on the target processing unit and not the calling processing unit. Optionally, the one or more first control-transfer instructions in the calling set of executable instructions comprise one or more suspend instructions for suspending execution of the calling block. Generating control-transfer information describing transfer of control within the coroutine allows generating control-transfer instructions that are platform dependent per block (and not for the entire coroutine as is current practice) and thus allows distributing execution of a software function implemented as a coroutine over multiple architectures, which is not possible according to current practice.

The solution described above differs from JIT compilation in several key points. A first difference is that according to the solution described above, in some embodiments control-transfer information is generated for each set of blocks before executing the software program, whereas according to JIT compilation practices control-transfer information is generated for a control-transfer point when execution of the software program reaches the control-transfer point. A second difference is that according to the solution described above, in some embodiments the set of blocks for which the calling set of executable instructions and the target set of executable instructions are generated is selected independently of reaching execution of the set of blocks, whereas according to JIT compilation practices the control-transfer point is not selected for the generation of executable instructions until execution of the software program reaches the control-transfer point. Even when considering reaching execution of the control-transfer point to be a form of selection, in JIT compilation this so-called selection is done only when reaching execution of the control-transfer point. On the other hand, according to the solution described above, in some embodiments, the set of blocks is selected before executing the software program. Optionally, the set of blocks is selected between iterations of executing the software program. Furthermore, selecting the set of blocks is optionally according to one or more statistical values, whereas in JIT compilation selection of the control-transfer point for which to generate executable instructions is typically controlled by flow of execution and reaching the control-transfer point and not based on statistical values. Another difference is that according to JIT compilation practices, a block of code is compiled to execute locally, on a processor compiling the block, and not transfer control of execution to another processor, let alone to another processor having another architecture different from an architecture of the processor compiling the block of code. On the other hand, in some embodiments the solution described above is specifically aimed at transferring control of execution to another processor, and provides a solution for transferring control of execution between processors that do not have a common architecture.

Before explaining at least one embodiment in detail, it is to be understood that embodiments are not necessarily limited in its application to the details of construction and the arrangement of the components and/or methods set forth in the following description and/or illustrated in the drawings and/or the Examples. Implementations described herein are capable of other embodiments or of being practiced or carried out in various ways.

Embodiments may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code, natively compiled or compiled just-in-time (JIT), written in any combination of one or more programming languages, including an object oriented programming language such as Smalltalk, C++, Java, Object-Oriented Fortran or the like, an interpreted programming language such as JavaScript, Python or the like, and conventional procedural programming languages, such as the "C" programming language, Fortran, or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), a coarse-grained reconfigurable architecture (CGRA), or programmable logic arrays (PLA) may execute the computer readable program instructions by utilizing state information of the computer readable program instructions to personalize the electronic circuitry, in order to perform aspects of embodiments.

Aspects of embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, showing a schematic block diagram of an exemplary system 100, according to some embodiments. In such embodiments, a plurality of processing units comprising processing unit 110A, processing unit 110B and processing unit 110C, collectively referred to as plurality of processing units 110, is connected to a plurality of memory areas comprising memory area 120A, memory area 120B and memory area 120C, collectively referred to as plurality of memory areas 120. Optionally, each of plurality of memory areas 120 is connected to one or more of plurality of processing units 110. In this example, processing unit 110A is connected to memory area 120A and memory area 120B, processing unit 110B is connected to memory area 120B and memory area 120C and processing unit 110C is connected to memory area 120C. Optionally, at least one hardware processor 101 is connected to one or more of plurality of processing units 110, optionally via one or more digital communication network interfaces (not shown). Optionally, at least one hardware processor 101 is electrically coupled to at least one of the plurality of processing units 110. Optionally, plurality of processing units 110 comprises at least one hardware processor 101. For brevity, the term "processing unit 101" is used henceforth to mean "at least one hardware processor 101" and the terms are used interchangeably. Optionally, processing unit 101 is connected to one or more of the plurality of memory areas 120.

In some embodiments, system 100 is configured to execute a software program by implementing the following optional method.

Figure 2:
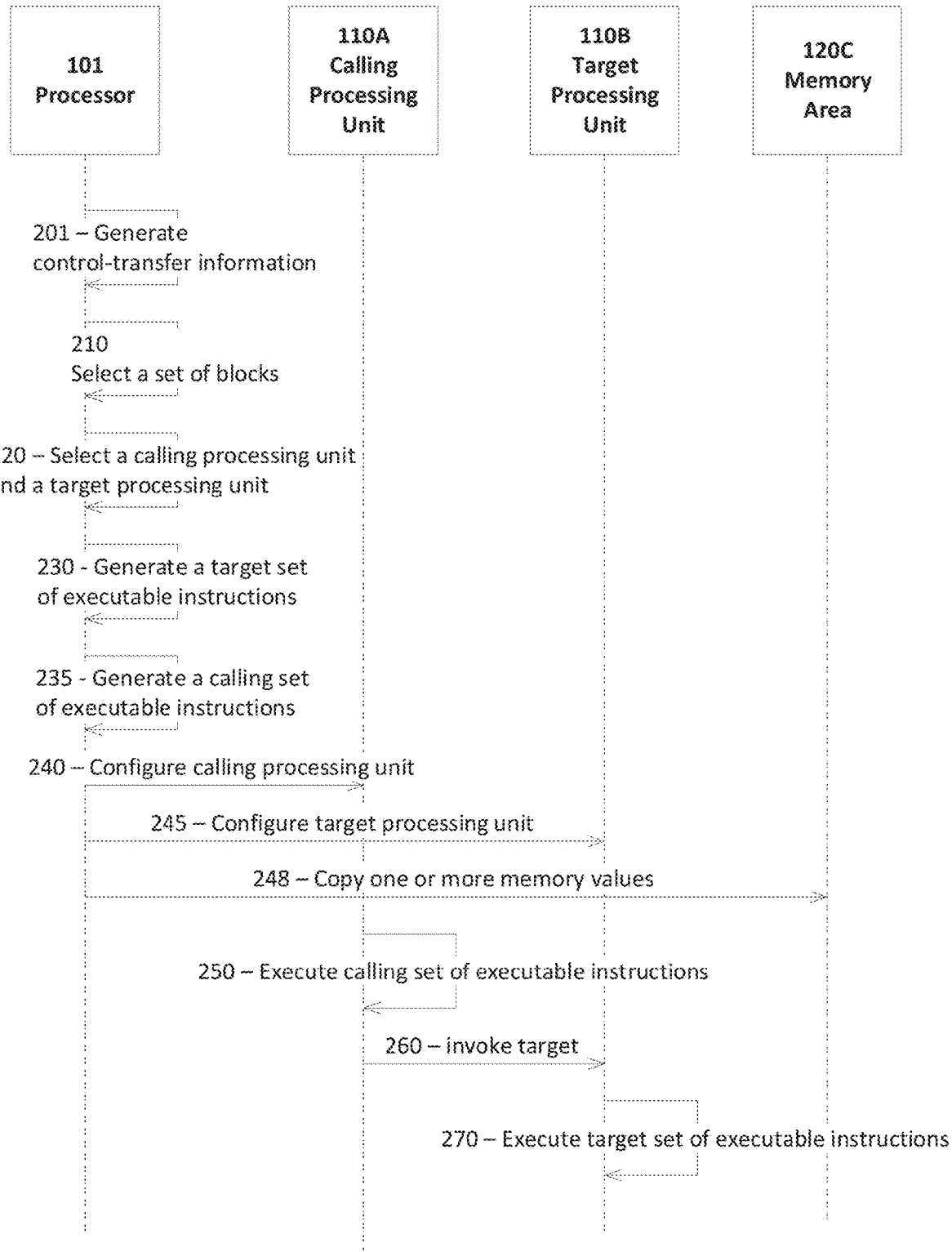
FIG. 2 is a sequence diagram of an optional flow of operations, according to some embodiments.

Reference is now made also to FIG. 2, showing a sequence diagram of an optional flow of operations 200, according to some embodiments. In such embodiments, in 201 processing unit 101 generates control-transfer information for one or more sets of blocks, where each set of blocks of the one or more sets of blocks comprises a calling block and a target block, and where the calling block and the target block are of a plurality of blocks of an intermediate representation of a software program. Optionally, the calling block invokes the target block. Optionally, the control-transfer information describes one or more values of the software program at an exit of the calling block (out-value). Optionally, the out-value is a live-out value of the calling block, i.e. a value that is computed within the calling block and is used beyond the scope of the calling block. Additionally, or alternatively, the control-transfer information may describe one or more other values of the software program at an entry to the target block (in value). Optionally, the in-value is a live-in value of the target block, i.e. a value that is needed as input to the target block. Optionally, the control-transfer information is platform independent, i.e. the control-transfer information does not depend on an architecture of any one or more of a processing unit executing the calling block and another processing unit executing the target block. Additionally or alternatively, the control-transfer unit may not depend on an operating system executed by any one or more of the processing unit executing the calling block and the other processing unit executing the target block.

Optionally, the control-transfer information comprises a mapping between the out-value and the in-value. Optionally, the control-transfer information comprises one or more registers of a processing circuitry. Optionally, the control-transfer information of a register is a register identifier, for example RCX for a processing circuitry implementing an Intel x86 architecture. Optionally, the one or more registers are part of the mapping between the out-value and the in-value, for example a live-out register on a processing unit executing the calling block, and additionally or alternatively a live-in register on another processing unit executing the target block. Optionally, the control-transfer information comprised one or more memory offset values, for example a memory offset value of an identified memory location in one of plurality of memory areas 120. Optionally, a memory offset value is part of a mapping between the out-value and the in-value. Optionally, a memory offset value is an offset into a memory stack. Optionally, a memory offset value is an offset into a heap. Optionally, a memory offset value is an offset from a base memory address of an identified data structure of the software program. Optionally, the control-transfer information comprises one or more type values associated with the out-value, and additionally or alternatively one or more other type values associated with the in-value. Some examples of a type value include, but are not limited to, a type identifier, an amount of bits and an endian indicator. A type identifier may be indicative of a scalar type, for example an integer number, a pointer, an enumerator or a floating point number. A type identifier may be indicative of compound data type, for example a type defined in the software program such as a structure, a class, a union, an array, a vector, a matrix or a tensor. A type identifier may be indicative of a high level type, for example a reference to a variable, a type of a function or a variadic type. Optionally, the one or more type values and the one or more other type values are part of a type signature, for example a type signature of a function call. Optionally, the control-transfer information comprises an amount of data variables, for example when the amount of data variables is part of a type signature.

Optionally, the control-transfer information comprises one or more computer instructions. Optionally, the one or more computer instructions comprise at least one compiled instruction. The at least one compiled instruction is optionally for execution on a processing unit executing the calling block. Optionally, the at least one compiled instruction is for execution on another processing unit executing the target block. Optionally, a compiled instruction is a machine code instruction.

Optionally, the one or more computer instructions comprise at least one intermediate computer instruction, in an intermediate programming language. Optionally, the at least one intermediate computer instruction is platform independent and does not depend on an architecture, and additionally or alternatively does not depend on an operating system, of a processing unit.

Optionally, processing unit 101 adds the control-transfer information to the intermediate representation of the software program. Optionally, processing unit 101 generates one or more executable software objects for executing the software program and optionally adds the control-transfer information to the one or more executable software objects. Optionally, processing unit 101 adds the control-transfer information to one or more files associated with the one or more executable software objects.

In 210, processing unit 101 optionally selects a set of blocks of the one or more sets of blocks. Optionally, processing unit 101 selects the set of blocks according to one or more statistical values collected while executing the software program. Some examples of a statistical value include an amount of times a block is executed, a duration of executing a block, a latency of executing a block, a percentage of a processor's utilization, and an amount of memory accesses.

In 220, processing unit 101 selects from plurality of processing units 110 a calling processing unit, for example processing unit 110A, and a target processing unit, for example processing unit 110B. Optionally, processing unit 110A has a first computer architecture. Optionally, processing unit 110B has a second computer architecture. Some examples of a computer architecture include, but are not limited to, a central processing unit, a multi-core central processing unit (CPU), a data processing unit (DPU), a microcontroller unit (MCU), an accelerated processing unit (APU), a field-programmable gate array (FPGA), a coarse-grained reconfigurable architecture (CGRA), a neural-network accelerator, an intelligence processing unit (IPU), an application-specific integrated circuit (ASIC), a quantum computer, and an interconnected computing grid, comprising a plurality of reconfigurable logical elements connected by a plurality of configurable data routing junctions. A CPU may be a complex instruction set computer (CISC). A CPU may be a reduced instruction set computer (RISC). Optionally, the first computer architecture is different from the second computer architecture. For example, the first computer architecture may be a RISC CPU, and the second computer architecture may be a CISC CPU. In another example, the first architecture is a CPU and the second architecture is an interconnected computing grid. In yet another example, the first architecture is CPU and the second architecture is an MCU.

Optionally, processing unit 110A executes a first operating system. Optionally, processing unit 110B executes a second operating system. Optionally, the first operating system is different from the second operating system. Optionally, one or more of processing unit 110A and processing unit 110B do not execute an operating system.

In 230, processing unit 101 optionally generates a target set of executable instructions using the target block and the control-transfer information of the selected set of blocks. Optionally, processing unit 101 generates the target set of executable instructions according to processing unit 110B, for example according to an architecture of processing unit 110B and additionally or alternatively an operating system executed by processing unit 110B. Optionally, in 245 processing unit 101 configures processing unit 110B to execute the target set of executable instructions.

Optionally, in 235 processing unit generates a calling set of executable instructions using the calling block and the control-transfer information of the selected set of blocks. Optionally, processing unit 101 generates the calling set of executable instructions according to processing unit 110A, for example according to an architecture of processing unit 110A and additionally or alternatively an operating system executed by processing unit 110A. In 240, processing unit 101 optionally configures processing unit 110A to execute the calling set of executable instructions.

Figure 3:
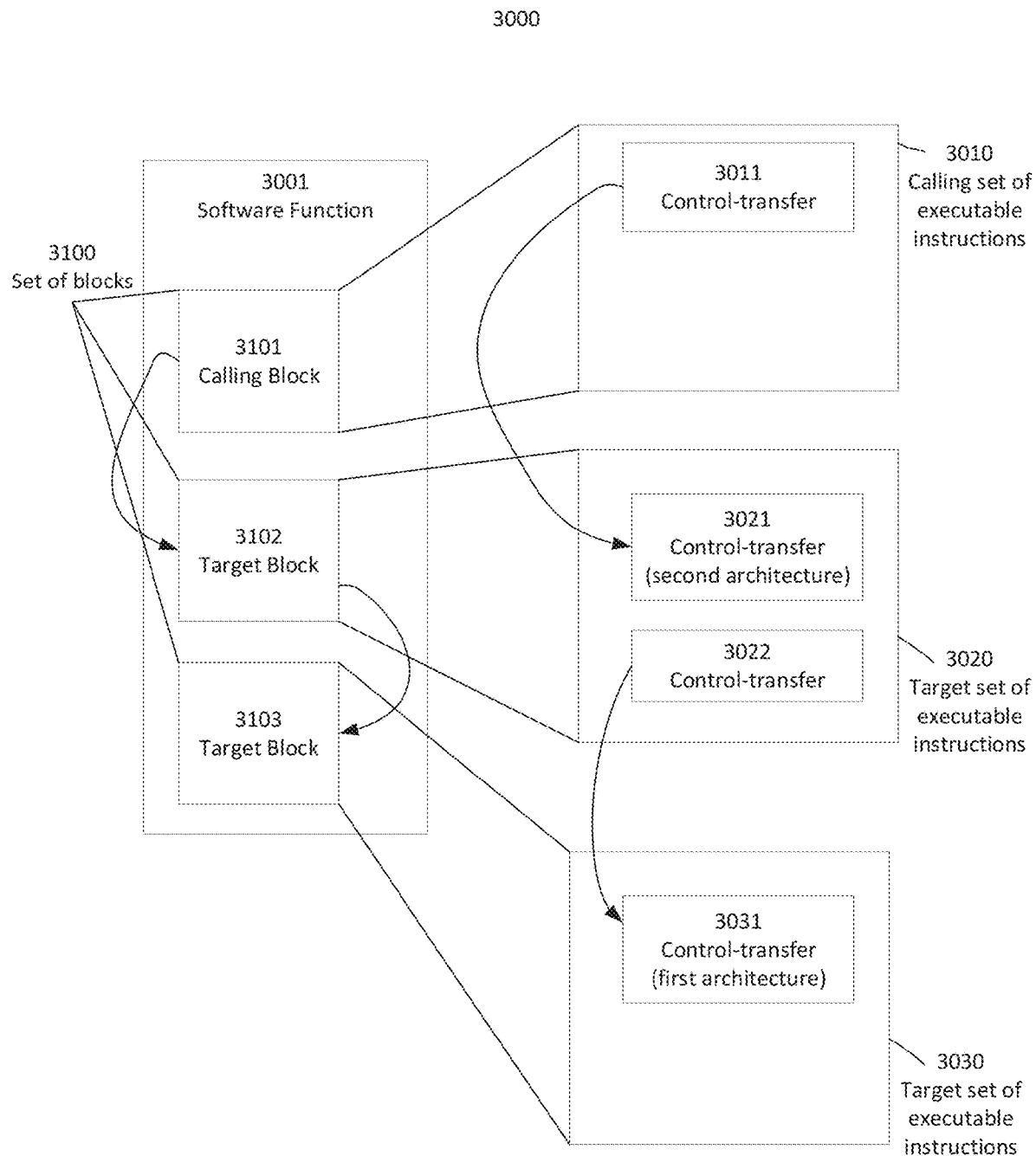
FIG. 3 is a schematic block diagram of an exemplary set of blocks, according to some embodiments.

Optionally, the selected set of blocks is at least part of a software function of the software program. Optionally, the software function is implemented as a coroutine, reference is now made also to FIG. 3, showing a schematic block diagram of an exemplary set of blocks 3000, according to some embodiments. In such embodiments, selected set of blocks 3100 is at least part of software function 3001. In this example, selected set of blocks 3100 comprises calling block 3101, target block 3102 and target block 3103. Optionally, calling block 3101 comprises one or more instructions for invoking target block 3102. Optionally, target block 3102 comprises one or more other instructions for invoking other target block 3103. Optionally, calling block 3101 and other target block 3103 are to be executed by calling processing unit 110A. Optionally, target block 3102 is to be executed by target processing unit 110B. Optionally other target block 3103 is calling block 3101.

Optionally, in 235 processing unit 101 generates calling set of executable instructions 3010, optionally comprising one or more control-transfer instructions 3011 for invoking target block 3102 on target processing unit 110B.

Optionally, in 230 processing unit 101 generates target set of executable instructions 3020, optionally comprising one or more control-transfer instructions 3021 for receiving control from calling processing unit 110A, optionally according to second architecture of target processing unit 110B. Optionally, processing unit 101 generates target set of executable instructions 3020 additionally including one or more control-transfer instructions 3022 for invoking other target block 3103 on calling processing unit 110A, serving as another target processing unit for executing other target block 3103. Optionally, processing unit 101 generates other target set of executable instructions 3030, optionally comprising one or more control transfer instructions 3031 for receiving control from target processing unit 110B, optionally according to first architecture of calling processing unit 110A.

Optionally, when other target block 3103 is to be executed by an additional processing unit, for example processing unit 110C having a third architecture, processing unit 101 generates one or more control transfer instructions 3031 for receiving control from target processing unit 110B according to the third architecture.

Reference is now made again to FIG. 2.

In 248, processing unit 101 optionally copies one or more memory values from memory area 120A to memory area 120B and additionally or alternatively to memory area 120C. Optionally, processing unit 101 releases the one or more memory values from memory area 120A. Optionally, 248 is executed before executing 240 and 245. Optionally, 248 is executed after executing 240 and 245.

In 250, processing unit 110A optionally executes the calling set of executable instructions. Optionally, executing the calling set of executable instructions by processing unit 110A comprises setting the out-value described by the control-transfer information of the set of blocks to an identified value.

Optionally, in 260 processing unit 110A executes one or more instructions to invoke execution of the target set of executable instructions by processing unit 110B. In 270, processing unit 110B optionally executes the target set of executable instructions, optionally in response to the one or more instruction to invoke execution of the target set of executable instructions. Optionally, while executing the target set of executable instructions processing unit 110B retrieves the identified value when accessing the in-value that is described by the control-transfer information of the set of blocks.

The steps of method 200 may be executed in more than one order with respect to execution of the software program. For example, at least part of method 200 may be executed while the software program is executed.

Figure 4:
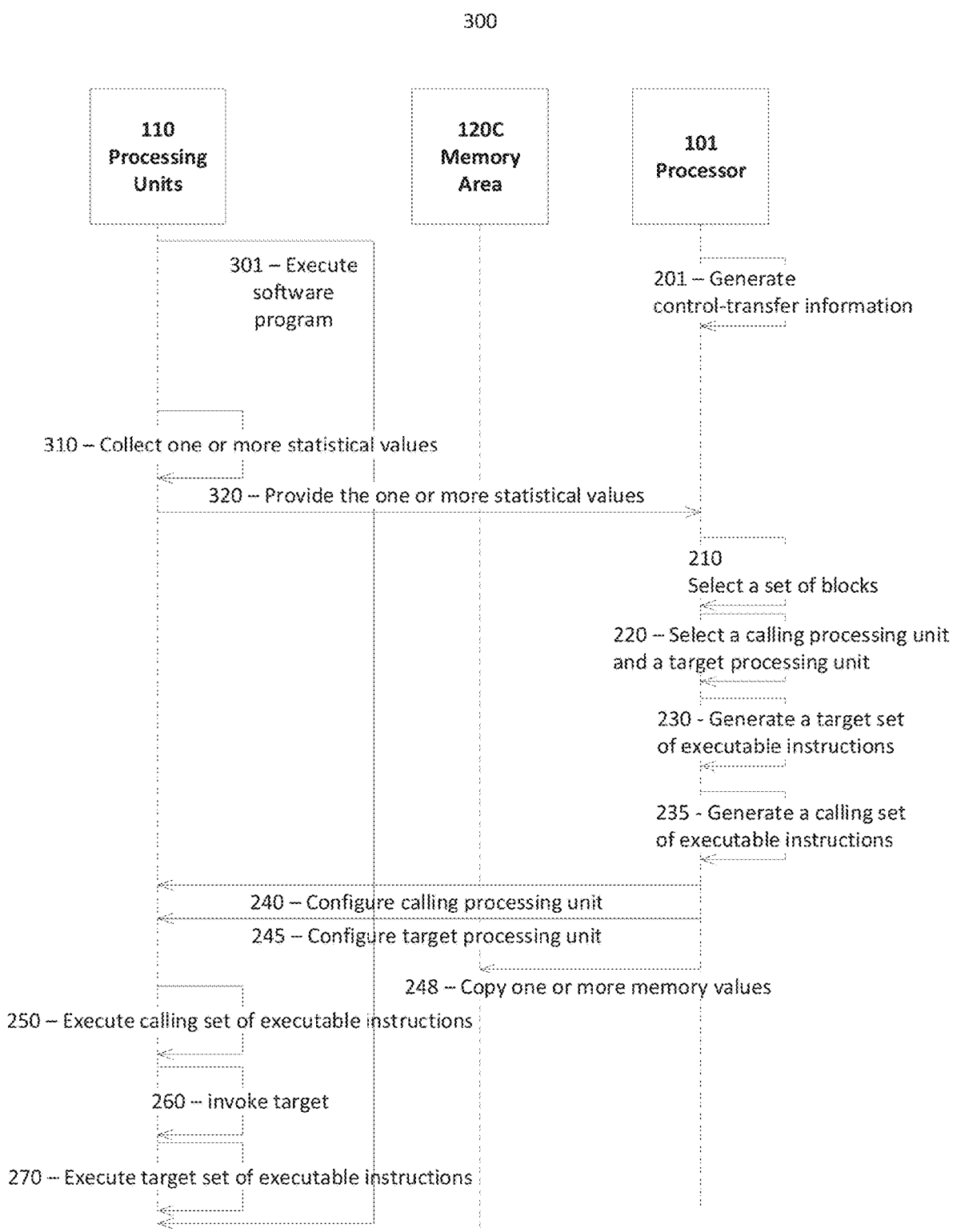
FIG. 4 is another sequence diagram of an optional flow of operations, according to some embodiments.

References is now made also to FIG. 4, showing another sequence diagram of an optional flow of operations 300, according to some embodiments. In such embodiments, the steps of method 200 are executed while in 301 the plurality of processing units 110 execute the software program. Optionally, in 310 the plurality of processing units 110 collect one or more statistical values while executing the software program. In 320, the plurality of processing units 110 provide the one or more statistical values to processing unit 110. Optionally, processing unit 101 generates control-transfer information for each of the one or more sets of blocks in 201 independently of the plurality of processing units 110 executing the software program in 301, optionally before the plurality of processing units 110 execute the software program in 301. In such embodiments, the processing unit 101 selects the set of blocks in 210 according to the one or more statistical values, after receiving the one or more statistical values from the plurality of processing units 110. Optionally, processing unit 101 selects the calling processing unit in 220, generates the target set of executable instructions in 230, generates the calling set of executable instructions in 235, configures processing unit 110A in 240, configures processing unit 110B in 245 and copies the one or more memory values in 248 while the plurality of processing units 110 execute the software program in 301. Optionally, processing unit 101 is part of the plurality of processing units 110 executing the software program.

In another example, at least part of method 200 is executed between execution iterations of the software program.

Figure 5:
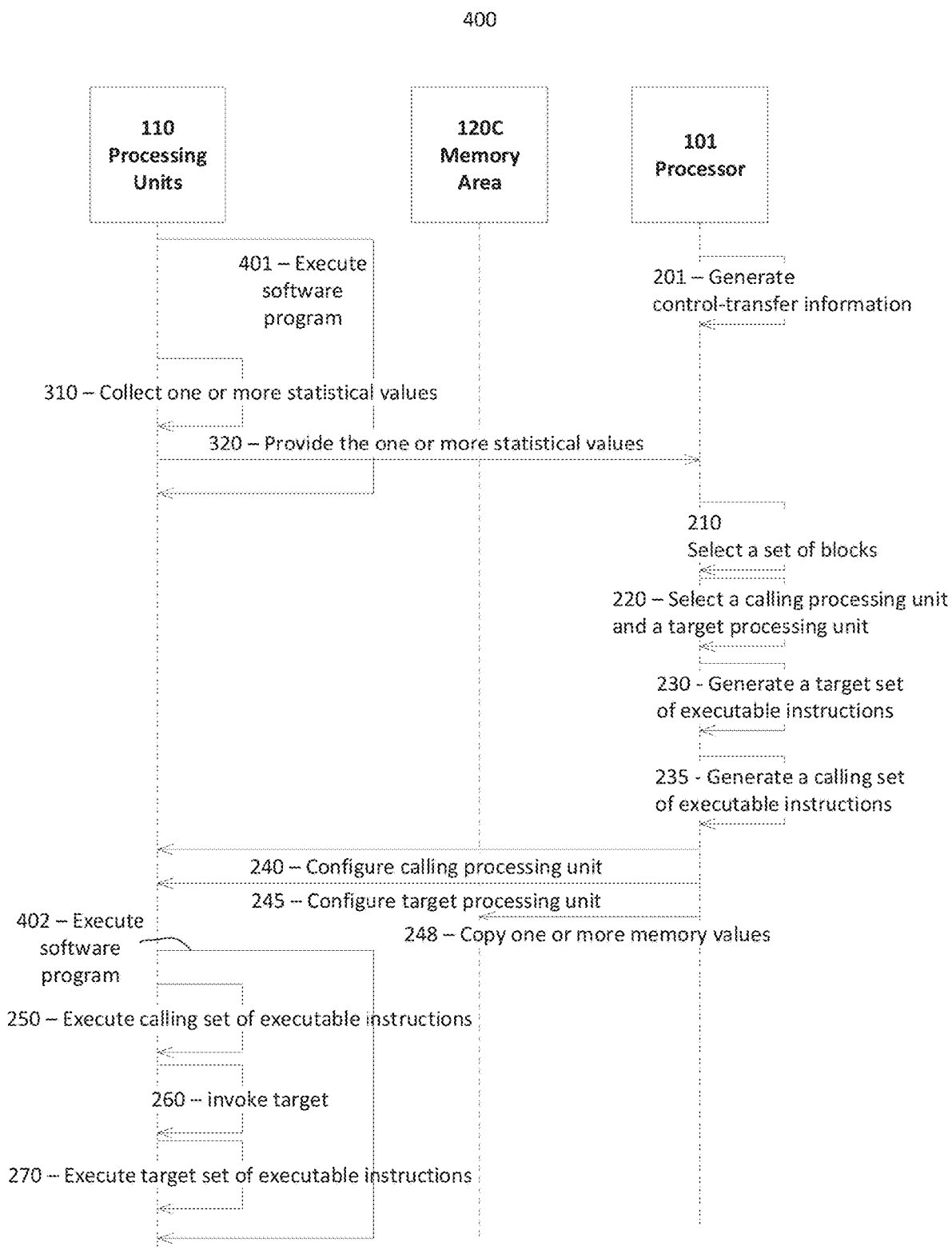
FIG. 5 is yet another sequence diagram of an optional flow of operations, according to some embodiments.

Reference is now made also to FIG. 5, showing yet another sequence diagram of an optional flow of operations 400, according to some embodiments. In such embodiments, the plurality of processing units 110 execute the software program in each of two or more iterations, for example comprising iteration 401 and iteration 402. Optionally, the plurality of processing units 110 collect the one or more statistical values in 310 and provide the one or more statistical values to processing unit 101 in 320 while executing the software program in iteration 401. Optionally, processor 101 executes 210, 220, 230, 235, 240, 245 and 248 after the plurality of processing units 110 execute the software program in iteration 401 and before the plurality of processing units 110 execute the software program in iteration 402. Optionally, processor 101 executes 210, 220, 230, 235, 240, 245 and 248 while the plurality of processing units 110 execute the software program in iteration 402.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant control-transfer information will be developed and the scope of the term control-transfer information is intended to include all such new technologies a priori.

As used herein the term "about" refers to +10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

Although embodiments have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A system for executing a software program, the system comprising a plurality of processing units and at least one hardware processor configured to:
   for at least one set of blocks, each set comprising a calling block and a target block of a plurality of blocks of an intermediate representation of the software program, generate control-transfer information describing at least one value of the software program at an exit of the calling block (out-value) and at least one other value of the software program at an entry to the target block (in-value);
   select a set of blocks of the at least one set of blocks according to at least one statistical value, where the at least one statistical value is collected while executing the software program;
   generate a target set of executable instructions using the target block and the control-transfer information of the selected set of blocks;
   generate a calling set of executable instructions using the calling block and the control-transfer information of the selected set of blocks;
   configure a calling processing unit of the plurality of processing units to execute the calling set of executable instructions; and
   configure a target processing unit of the plurality of processing units to execute the target set of executable instructions.

2. The system of claim 1, wherein the at least one hardware processor is further configured to select the set of blocks, generate the target set of executable instructions, generate the calling set of executable instructions, configure the calling processing unit and configure the target processing unit while executing the software program.

3. The system of claim 1, wherein the at least one hardware processor is further configured to execute the software program in each of at least two iterations, comprising a first iteration and a second iteration; and
   wherein the at least one hardware processor is additionally further configured to select the set of blocks, generate the target set of executable instructions, generate the calling set of executable instructions, configure the calling processing unit and configure the target processing unit after executing the software program in the first iteration and before executing the software program in the second iteration.

4. The system of claim 1, wherein the calling processing unit has a first computer architecture;
   wherein the target processing unit has a second computer architecture; and
   wherein the first computer architecture is different from the second computer architecture.

5. The system of claim 4, wherein the first computer architecture is one of: a central processing unit, a multi-core central processing unit (CPU), a data processing unit (DPU), a microcontroller unit (MCU), an accelerated processing unit (APU), a field-programmable gate array (FPGA), a coarse-grained reconfigurable architecture (CGRA), a neural-network accelerator, an intelligence processing unit (IPU), an application-specific integrated circuit (ASIC), a quantum computer, and an interconnected computing grid, comprising a plurality of reconfigurable logical elements connected by a plurality of configurable data routing junctions.

6. The system of claim 4, wherein the second computer architecture is one of: a central processing unit, a multi-core central processing unit (CPU), a data processing unit (DPU), a microcontroller unit (MCU), an accelerated processing unit (APU), a field-programmable gate array (FPGA), a coarse-grained reconfigurable architecture (CGRA), a neural-network accelerator, an intelligence processing unit (IPU), an application-specific integrated circuit (ASIC), a quantum computer, and an interconnected computing grid, comprising a plurality of reconfigurable logical elements connected by a plurality of configurable data routing junctions.

7. The system of claim 1, wherein the calling processing unit executes a first operating system;
   wherein the second processing unit executes a second operating system; and
   wherein the first operating system is different from the second operating system.

8. The system of claim 1, wherein at least one of the calling processing unit and the target processing unit does not execute an operating system.

9. The system of claim 1, wherein executing the calling set of executable instructions by the calling processing unit comprises setting the out-value described by the control-transfer information to an identified value; and
   wherein the target processing unit retrieves the identified value when accessing the in-value while executing the target set of executable instructions, where the in-value is described by the control-transfer information.

10. The system of claim 1, wherein the control-transfer information is not dependent on one identified computer architecture of the calling processing unit.

11. The system of claim 1, wherein the control-transfer information is not dependent on one other identified computer architecture of the target processing unit.

12. The system of claim 1, wherein the control-transfer information is not dependent on one identified operating system executed by the calling processing unit.

13. The system of claim 1, wherein the control-transfer information is not dependent on one other identified operating system executed by the target processing unit.

14. The system of claim 1, wherein the control-transfer information comprises a mapping between the out-value and the in-value.

15. The system of claim 1, wherein the control-transfer information comprises at least one register of a processing circuitry.

16. The system of claim 1, wherein the control-transfer information comprises at least one memory offset value.

17. The system of claim 1, wherein the control-transfer information comprises at least one type value associated with the out-value, and at least one other type value associated with the in-value.

18. The system of claim 17, wherein the at least one type value comprises at least one of: a type identifier, an amount of bits, and an endian indicator.

19. The system of claim 1, wherein the control-transfer information comprises an amount of variables.

20. The system of claim 1, wherein the control-transfer information comprises at least one computer instruction.

21. The system of claim 20, wherein the at least one computer instruction comprises at least one compiled instruction.

22. The system of claim 20, wherein the at least one computer instruction comprises at least one intermediate computer instruction.

23. The system of claim 1, wherein generating the control-transfer information is done before executing the software program; and
   wherein the at least one hardware processor is further configured to select the target processing unit from the plurality of processing units after collecting the at least one statistical value.

24. The system of claim 23, wherein the at least one hardware processor is further configured to generate the target set of computer instructions according to the selected target processing unit.

25. The system of claim 1, wherein the at least one hardware processor is further configured to add the control-transfer information to the intermediate representation of the software program.

26. The system of claim 1, wherein the at least one hardware processor is further configured to:
   generate at least one executable software object for executing the software program; and
   at least one of:
      add the control-transfer information to the at least one executable software object; and
      add the control-transfer information to at least one file associated with the at least one executable software object.

27. The system of claim 1, wherein the at least one hardware processor is further configured to:
   for the selected set of blocks, generate the control-transfer information of the selected set of blocks to further describe at least one additional value of the software program at another exit of the target block and at least one additional other value of the software program at another entry to another block of the selected set of blocks (other target block);
   generate another target set of executable instructions using the other target block and the control-transfer information of the selected set of blocks; and
   configure the calling processing unit of the plurality of processing units to execute the other target set of executable instructions.

28. The system of claim 1, further comprising a plurality of memory areas, each connected to at least one of the plurality of processing units;
   wherein the at least one hardware processor is further configured to copy at least one memory value from a first memory area of the plurality of memory areas to a second memory area of the plurality of memory areas, where the first memory area is connected to the calling processing unit and the second memory area is connected to the target processing unit.

29. A method for executing a software program, comprising:
   for at least one set of blocks, each set comprising a calling block and a target block of a plurality of blocks of an intermediate representation of the software program, generating control-transfer information describing at least one value of the software program at an exit of the calling block (out-value) and at least one other value of the software program at an entry to the target block (in-value);
   selecting a set of blocks of the at least one set of blocks according to at least one statistical value, where the at least one statistical value is collected while executing the software program;
   generating a target set of executable instructions using the target block and the control-transfer information of the selected set of blocks;
   generating a calling set of executable instructions using the calling block and the control-transfer information of the selected set of blocks;
   configuring a calling processing unit of a plurality of processing units to execute the calling set of executable instructions; and
   configuring a target processing unit of the plurality of processing units to execute the target set of executable instructions.

30. A software program product for executing a software program, comprising:
   a non-transitory computer readable storage medium;
   first program instructions for: for at least one set of blocks, each set comprising a calling block and a target block of a plurality of blocks of an intermediate representation of the software program, generating control-transfer information describing at least one value of the software program at an exit of the calling block (out-value) and at least one other value of the software program at an entry to the target block (in-value);
   second program instructions for: selecting a set of blocks of the at least one set of blocks according to at least one statistical value, where the at least one statistical value is collected while executing the software program;
   third program instructions for: generating a target set of executable instructions using the target block and the control-transfer information of the selected set of blocks;
   fourth program instructions for: generating a calling set of executable instructions using the calling block and the control-transfer information of the selected set of blocks;
   fifth program instructions for: configuring a calling processing unit of a plurality of processing units to execute the calling set of executable instructions; and
   sixth program instructions for: configuring a target processing unit of the plurality of processing units to execute the target set of executable instructions;
   wherein the first, second, third, fourth, fifth and sixth program instructions are executed by at least one computerized processor from the non-transitory computer readable storage medium.

* * * * *